United States Patent
Shim

(10) Patent No.: US 6,757,088 B2
(45) Date of Patent: Jun. 29, 2004

(54) LASER SCANNING UNIT

(75) Inventor: Hyeong-Seog Shim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/142,172

(22) Filed: May 10, 2002

(65) Prior Publication Data

US 2002/0131138 A1 Sep. 19, 2002

Related U.S. Application Data

(62) Division of application No. 09/771,561, filed on Jan. 30, 2001, now Pat. No. 6,690,498.

(30) Foreign Application Priority Data

Mar. 27, 2000 (KR) .......................................... 2000/15538

(51) Int. Cl.[7] ............................................... G02B 26/08
(52) U.S. Cl. ........................ 359/196; 359/216; 359/871; 347/257
(58) Field of Search ................................. 359/196–226, 359/871; 347/234–235, 241–245, 250, 256–261, 263; 250/234–236

(56) References Cited

U.S. PATENT DOCUMENTS

| | | | |
|---|---|---|---|
| 4,918,306 A | * | 4/1990 | Saito ........................ 250/235 |
| 5,606,449 A | | 2/1997 | Nishiyama |
| 5,751,462 A | | 5/1998 | Shiraishi et al. |
| 6,005,703 A | | 12/1999 | Maddox et al. |
| 6,061,162 A | | 5/2000 | Shiraishi et al. |
| 6,081,289 A | | 6/2000 | Ogasawara et al. |
| 6,104,519 A | | 8/2000 | Shiraishi et al. |
| 6,154,246 A | | 11/2000 | Ogasawara et al. |
| 6,198,565 B1 | * | 3/2001 | Iseki et al. .................. 359/224 |

* cited by examiner

*Primary Examiner*—James Phan
(74) *Attorney, Agent, or Firm*—Robert E. Bushnell, Esq.

(57) ABSTRACT

A laser scanning unit disclosed in the present invention is intended to form an image on a photo-sensitive drum by generating laser beams in a facsimile unit, a copying machine and a printer using laser beams. The laser scanning unit includes a collimated lens reforming the laser beams emitted from a laser diode into parallel beams, a polygon mirror scanning by deflecting the above laser beams in constant velocity, a f-theta lens for adjusting a focus on a scanning plane by polarizing the laser beams to a main scanning direction and correcting an aberration, a reflecting surface attached with a reflecting film reflecting said laser beams into a horizontal direction, an optical sensor receiving the laser beams reflected from said reflecting film and a base plate for supporting said optical sensor and reflecting surface. According to the present invention, it is not needed an additional component such as the conventional plate spring and reflecting mirror, by using the reflecting film attached to the reflecting surface projected on a base plate instead of a horizontal synchronous mirror, in order to reflect the laser beams with the optical sensor. Accordingly, the present invention can reduce the fabrication cost of a product.

12 Claims, 7 Drawing Sheets

LASER SCANNING UNIT

This application is a divisional application of U.S. patent application Ser. No. 09/771,561 filed on 30 Jan. 2001, now U.S. Pat. No. 6,690,498. This related application is relied on and incorporated herein by references in its entirety.

CLAIM OF PRIORITY

This application makes reference to, incorporates the same herein, and claims all benefits accruing under 35 U.S.C. §119 from my application entitled LASER SCANNING UNIT filed with the Korean Industrial Property Office on 27 Mar. 2000 and there duly assigned Ser. No. 2000/15538.

BACKGROUND OF THE INVENTION

1. Field of the Invention

The present invention relates to laser scanning unit, more particularly to laser scanning unit for forming an image on a photo-sensitive drum by generating laser beams in a facsimile, a copying machine and a printer using laser beams.

2. Description of the Related Art

In general, a laser printer is an apparatus reviving a picture image by forming images with laser beams emitted from a laser diode by a video signal of an input image on a photo-sensitive drum and by transcribing a latent image formed on the photo-sensitive drum on a medium such as a paper.

Like said, a laser printer includes a sheet cassette where a number of papers are received, a paper feeding part for feeding a paper by picking up the paper in the sheet cassette, a laser scanning unit for forming an image on a photo-sensitive drum by generating laser beams, a printing part forming an image on a paper fed from the paper feeding part by a potential difference between a toner and a transcribing roller imaged on the photo-sensitive drum, and a paper ejecting part.

For example, U.S. Pat. No. 6,104,519 for a Multi-Beam Exposure Unit to Shiraishi et al., discloses a schematic plan view illustrating the layout of optical members of a light scanning unit built in the image forming apparatus. Element number 25 is a horizontal synchronization detection mirror or Beam Detect or BD mirror. Light from the horizontal synchronization detection mirror 25 is sent to a horizontal synchronization detector 23 for timing of writing an image along one scanning line of an image forming apparatus. Similar apparatuses are illustrated in U.S. Pat. No. 6,081,289 for an Intensity Control Unit For Image Forming Apparatuses to Ogasawara et al., and U.S. Pat No. 5,606,449 for an Optical Scanning Device to Nishiyama. However, none of these references discuss the structure of the horizontal synchronization mirror. What is needed is a simple and effective design to reflect horizontally a beam into a detection device for synchronization purposes for an image forming apparatus.

SUMMARY OF THE INVENTION

It is therefore an object of the present invention to provide an improved device for reflecting a beam horizontally with respect to the image forming apparatus.

It is yet another object of the present invention to provide a simplified apparatus for horizontally reflecting a beam in an image forming apparatus.

It is yet another object to provide a more efficient apparatus for horizontally reflecting a beam in an image forming apparatus.

It is also an object to use a reflective film on a reflective surface instead of the horizontal synchronization mirror to reflect horizontally a beam.

According to one aspect of the present invention, a laser scanning unit of the present invention includes: a collimated lens reforming laser beams emitted from a laser diode into parallel beams; a polygon mirror scanning by deflecting the laser beams passing through said collimated lens in constant velocity; a f-theta lens adjusting a focus on a scanning plane by polarizing the laser beams reflected by said polygon mirror into a main scanning direction and correcting an aberration; a reflecting surface attached with a reflecting film reflecting the laser beams into a horizontal direction; an optical sensor receiving the laser beams reflected by the reflecting film; and a base plate for supporting the optical sensor and reflecting surface. It is desirable that the reflecting surface is made in a body with the base plate during plastic injection molding of the base plate, and the reflecting film is an aluminum thin film having good reflecting property of laser beams.

According to the present invention like the above, it is not needed to have an additional horizontal synchronous mirror and a plate spring fixing thereof as before, by reflecting laser beams by attaching a reflective film to a reflecting surface formed by being projected on a base plate in a body, instead of a horizontal synchronous mirror fixed by an additional plate spring between two projected portions formed on the conventional base plate with a fixed interval, in order to reflect the laser beams into a direction of an optical sensor, that is, into a horizontal direction. Accordingly, the present invention can reduce the fabrication cost of a component.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
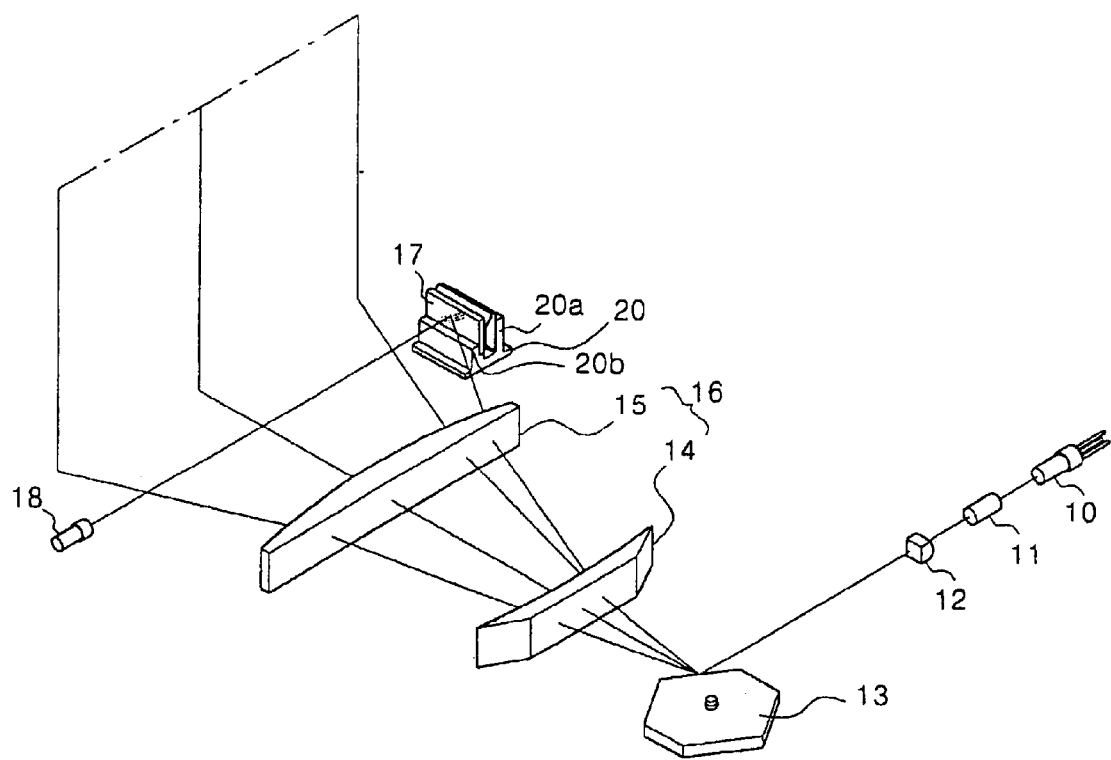
FIG. 1 is a configuration showing a scanning apparatus of a laser printer.

A laser scanning unit in a laser printer having a configuration like said is shown in FIG. 1. As shown, the laser scanning unit includes a laser diode 10 emitting a light source of laser beams, a collimated lens 11 reforming the laser beams into parallel beams to an optical axis, a cylindrical lens 12 reforming the parallel beams into linear beams, a polygon mirror 13 scanning by deflecting the linear beams of a horizontal direction into constant line, a polygon mirror driving motor(not shown) rotating the polygon mirror 13 in constant velocity, a f-theta lens 16 for adjusting the focus on a scanning plane by refracting a light beam in constant velocity being reflected from the polygon mirror 13 and having a constant refractive index to a main scanning direction and by correcting an aberration, an image forming reflecting mirror reflecting laser beams passing through the f-theta lens 16 to a predetermined direction and making the laser beams incident onto the image forming plane, that is, the surface of a photo-sensitive drum(not shown), a horizontal synchronous mirror 17 reflecting the laser beams passing through the f-theta lens 16 to a horizontal direction, and an optical sensor 18 for synchronizing by receiving the laser beams reflected from the horizontal synchronous mirror 17. Here, the f-theta lens 16 includes a lens 14 for correcting a spherical aberration focusing and polarizing the laser beams refracted at constant velocity by the polygon mirror 13, and a toric lens 15 for polarizing the laser beams of which the spherical aberration is corrected to a main scanning direction with a constant refractive index.

Figure 2:
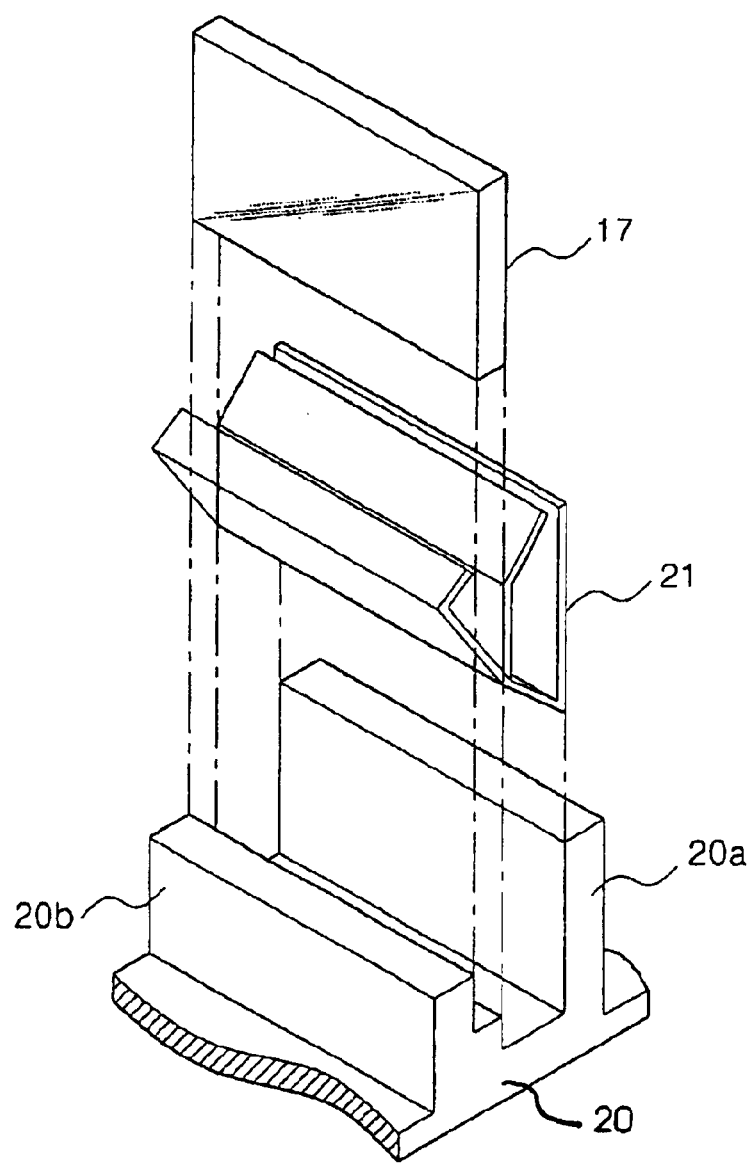
FIG. 2 is a perspective view showing a horizontal synchronous reflecting part of the scanning unit of FIG. 1.
Figure 3:
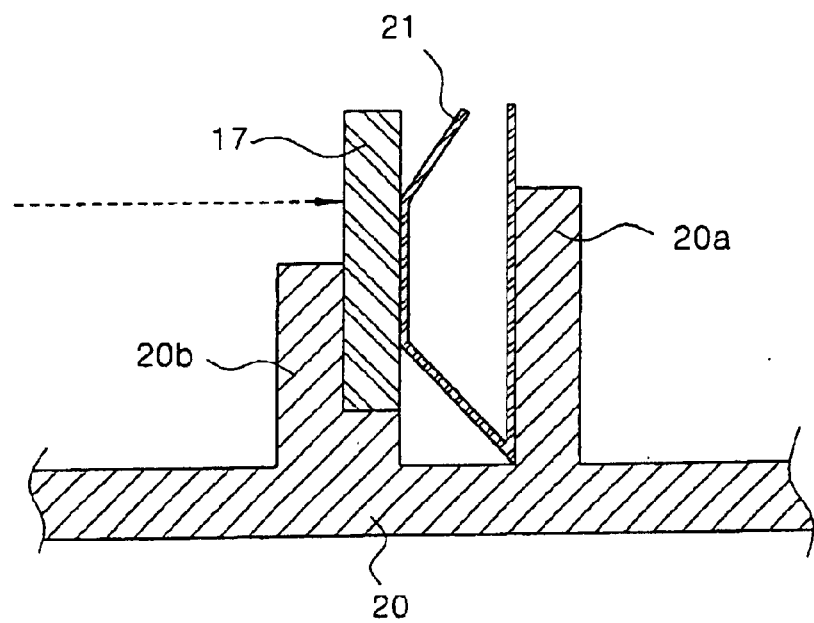
FIG. 3 is a sectional view showing the horizontal synchronous reflecting part of the scanning unit of FIG. 1.

On the other hand, the horizontal synchronous mirror 17 for reflecting the laser beams horizontally, as shown in FIG. 2, is assembled by a plate spring 21 between a first projecting portion 20a projected on a base plate 20 and a second projecting portion 20b separated from the first projecting portion 20a in a fixed interval. The horizontal synchronous mirror 17, after whose one side is supported in the inside of the second projecting portion 20b, is fixed by an elastic force of the plate spring 21 inserted between the first projecting portion 20a and the horizontal synchronous mirror 17. Here, the plate spring 21 is bent several times and is formed in a "[" shape, and the distance between bent points of the plate spring 21 is longer than the distance between the first projecting portion 20a and another side of the horizontal synchronous mirror 17. That is, a user inserts the plate spring 21 between the first projecting portion 20a and another side of the horizontal synchronous mirror 17 by pushing both sides of the plate spring, after supporting one side of the horizontal synchronous mirror 17 in the inside of the second projecting portion 20b, in order to fix the horizontal synchronous mirror 17, as shown in FIG. 2 and FIG. 3. Then, the horizontal synchronous mirror 17 is fixed between the first projecting portion 20a and the second projecting portion 20b by an elastic force of the plate spring 21.

But the laser scanning unit of FIGS. 1 and 2 have the following problem. That is, the horizontal synchronous mirror 17 playing a role of reflecting the laser beams into a horizontal direction is to be fabricated additionally, and because the fabricated horizontal synchronous mirror 17 is to be fixed by additional plate spring 21 and the first projecting portion 20a and the second projecting portion 20b, additional horizontal synchronous mirror 17 and the plate spring 21 to fix thereof are to be fabricated. Also, because additional horizontal synchronous mirror 17 and plate spring 21 are to be fabricated additionally, the fabrication cost rises.

Figure 4:
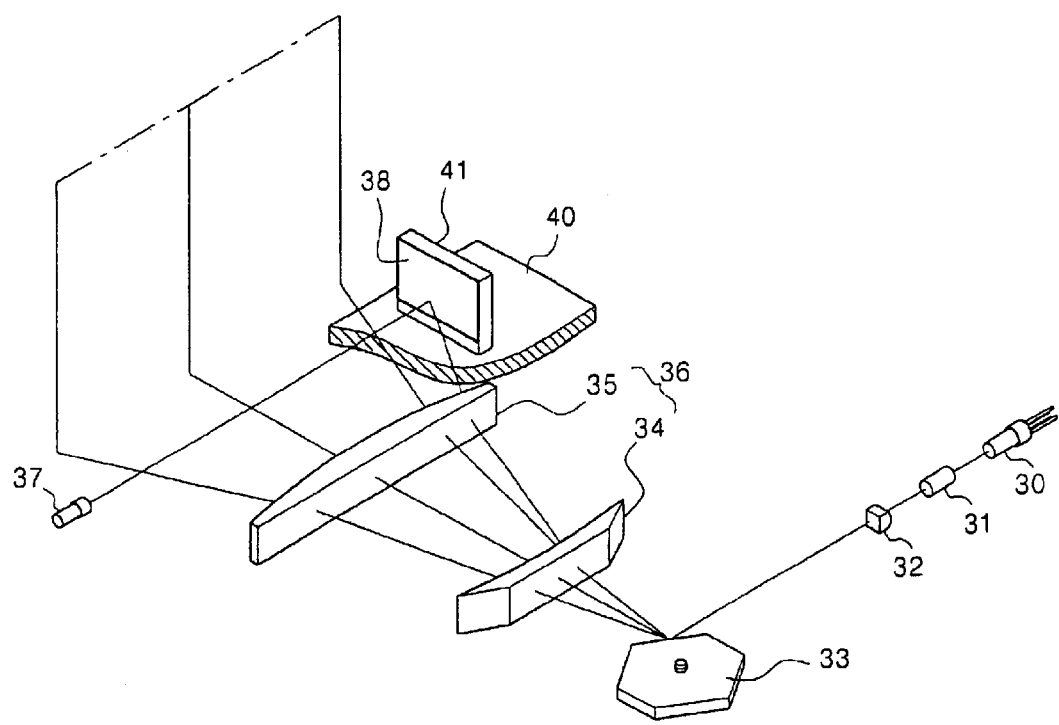
FIG. 4 is a configuration showing a scanning apparatus of a laser printer according to an embodiment of the present invention.
Figure 5:
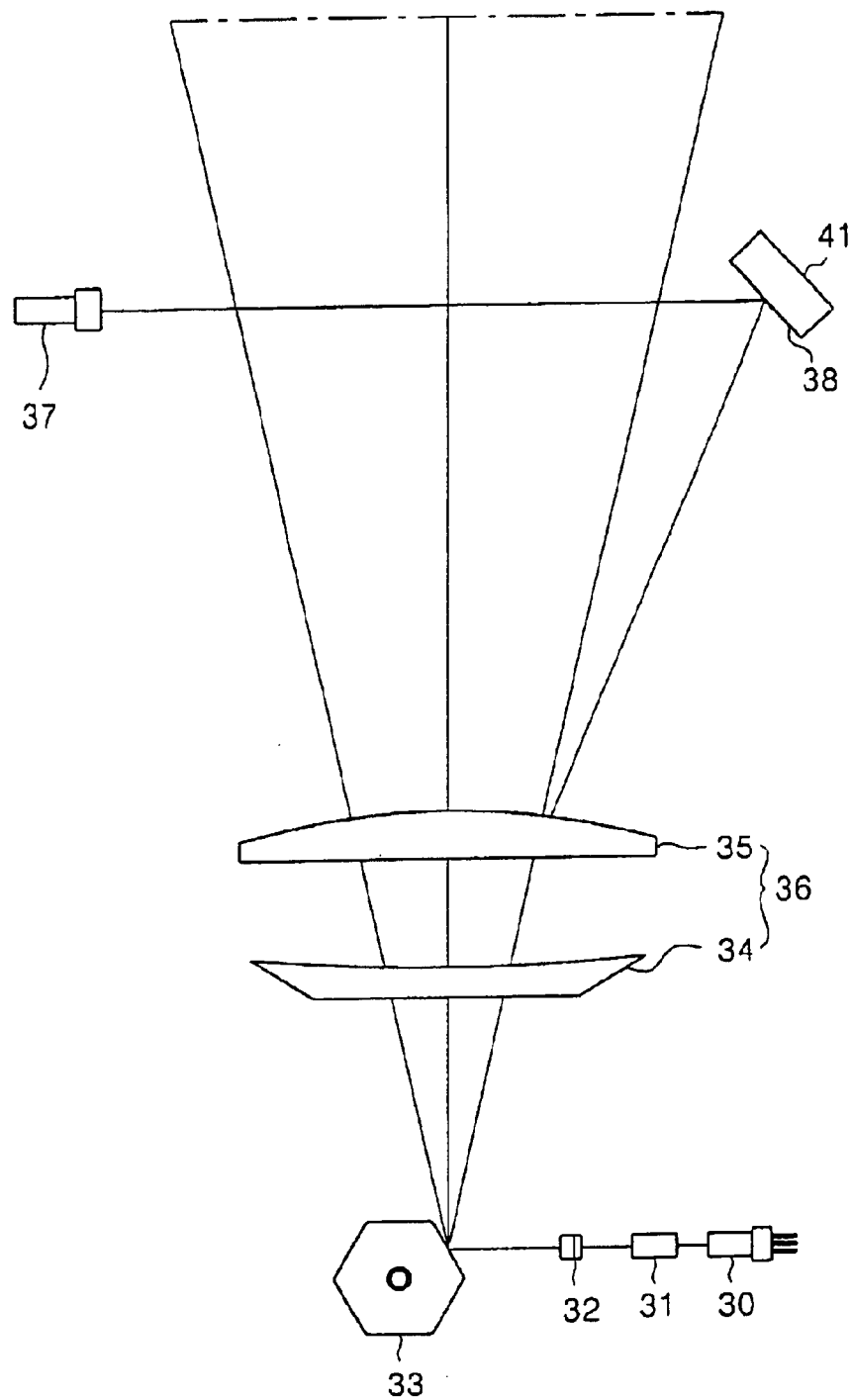
FIG. 5 is a plan view showing a configuration of the scanning apparatus of the laser printer according to an embodiment of the present invention.
Figure 6:
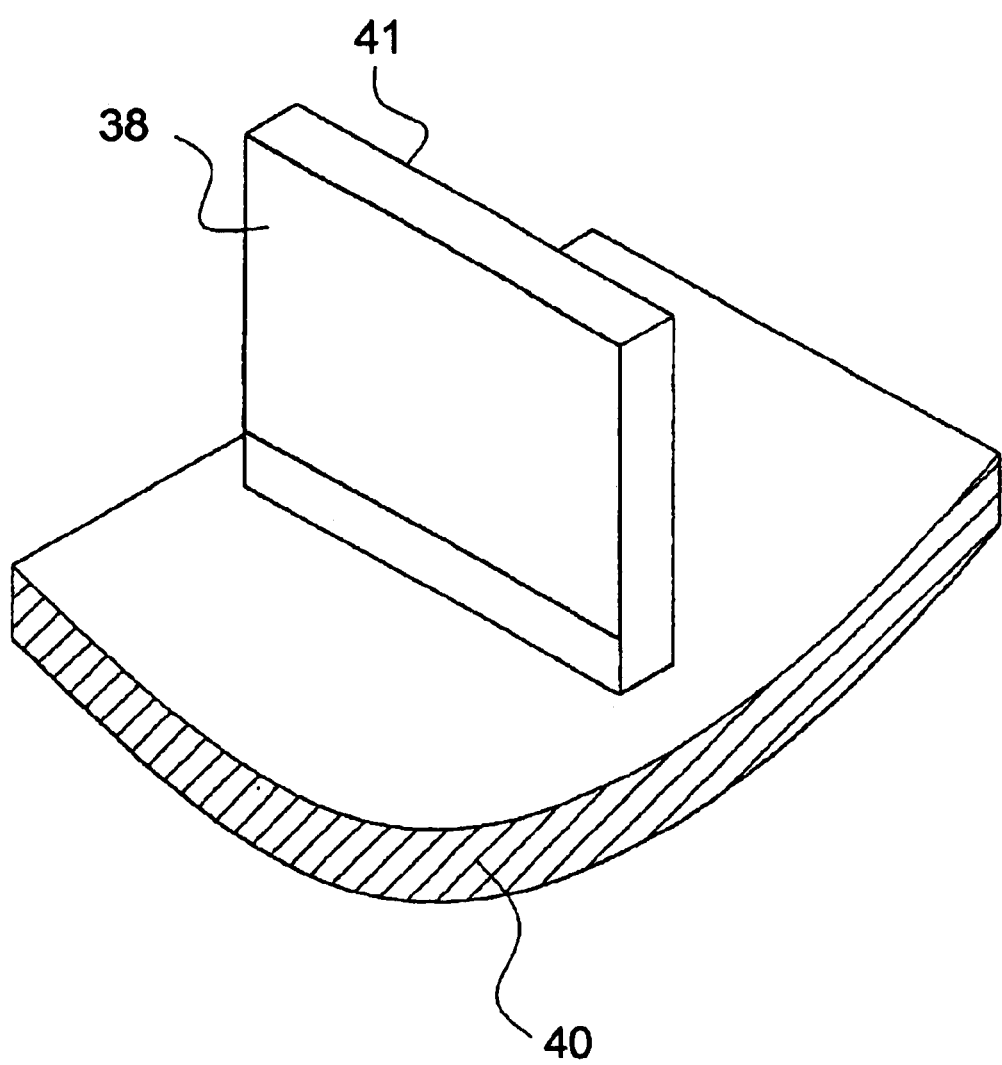
FIG. 6 is a perspective view showing a horizontal synchronous reflecting surface of the scanning apparatus of the laser printer of FIGS. 4 and 5 according to an embodiment of the present invention.
Figure 7:
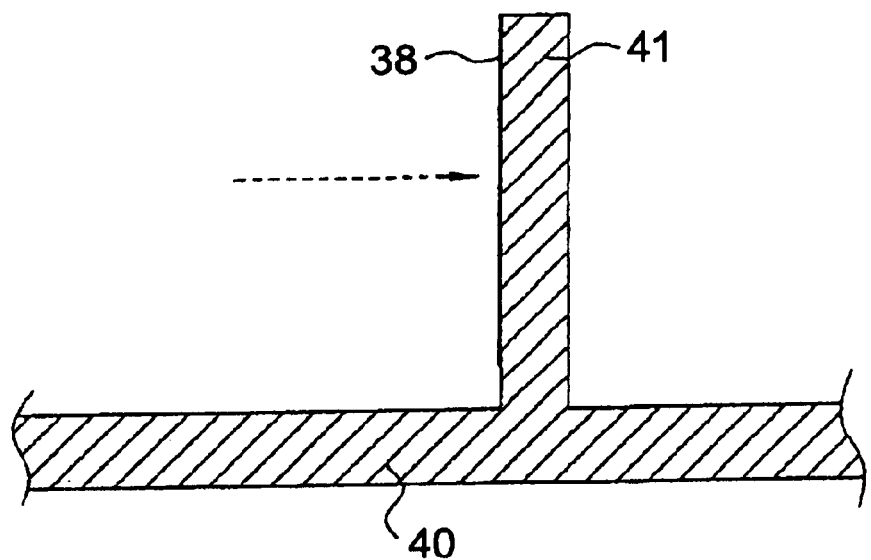
FIG. 7 is a sectional view showing the horizontal synchronous reflecting surface of the scanning apparatus of the laser printer of FIGS. 4 and 5 according to an embodiment of the present invention.

FIG. 4 and FIG. 5 are configurations showing a laser scanning unit according to the present invention, and FIG. 6 is a perspective view showing a major part of the laser scanning unit according to the present invention and FIG. 7 is a sectional view showing a major part of the laser scanning unit according to the present invention. As shown, a laser scanning unit according to the present invention includes a laser diode 30 emitting laser beams, a collimated lens 31 reforming the laser beams into parallel beams, a polygon mirror 33 scanning by deflecting the laser beams into a horizontal direction in constant velocity, a f-theta lens 36 correcting an aberration by refracting the laser beams into a main scanning direction and adjusting a focus on a scanning plane, a reflecting surface 41 attached with a reflecting film 38 reflecting the laser beams into a horizontal direction, and an optical sensor 37 receiving the laser beams reflected by the reflecting surface 41. A cylindrical lens 32 reforming the laser beams reformed into parallel beams by the collimated lens 31 into linear beams is arranged between the collimated lens 31 and the polygon mirror 33. Here, the f-theta lens 36 is made of a lens 34 for correcting a spherical aberration focusing and polarizing the laser beams refracted at constant velocity by the polygon mirror 33, and a toric lens 35 polarizing the laser beams of which the spherical aberration is corrected to a main scanning direction with a constant refractive index.

On the other hand, the reflecting surface 41 reflecting the laser beams passing through the f-theta lens 36 into a horizontal direction is formed by being projected on a base plate 40, as shown in FIG. 6. That is, the reflecting surface 41 is formed by being projected as a body in injection molding of the base plate 40. And, the reflecting film 38 making the reflection of the laser beams more efficient is attached to the reflecting surface 41 with an adhesion. Said reflecting film 38 is formed with a metallic thin film like an aluminum thin film material having good reflecting property of the laser beams.

The operation of laser scanning unit according to the present invention constituted like said will be described briefly as follows. Laser beams are emitted from the laser diode 30 according to a video signal of an input picture. The laser beams emitted like said is reformed into parallel beams through the collimated lens 31 and is incident on the cylindrical lens 32. The laser beams incident on the cylindrical lens 32, after being reformed into linear beams, is reflected by the polygon mirror 33 scanning by deflecting the linear beams in a horizontal direction in constant velocity. The laser beams reflected by the polygon mirror 33 passes through the f-theta lens 36 adjusting a focus on the scanning plane by correcting an aberration by refracting the light beams in constant velocity into a main scanning direction with a constant refractive index. A part of the laser beams passing through the f-theta lens 36 like said is incident on the reflecting film 38 attached to the reflecting surface 41 reflecting into a horizontal direction, and the rest of the laser beams is imaged on a photo-sensitive drum(not shown) by being reflected by an image forming reflecting mirror not shown. A picture image is output by transcribing a latent image formed on the photo-sensitive drum like said onto a medium like a paper.

According to the present invention like said, it is not needed an additional horizontal synchronous mirror and a plate spring fixing thereof as before, by reflecting laser beams by attaching a reflective film to a reflecting surface formed by being projected on a base plate in a body, instead of a horizontal synchronous mirror fixed by an additional plate spring between two projected portions formed on the conventional base plate with a fixed interval, in order to reflect the laser beams into a direction of an optical sensor, that is, into a horizontal direction. Accordingly, the present invention can reduce the fabrication cost of a component.

While the present invention has been particularly shown and described with reference to a particular embodiment thereof, it will be understood by those skilled in the art that various changes in form and detail may be effected therein without departing from the spirit and the scope of the invention as defined by the appended claims.

What is claimed is:

1. An apparatus for reflecting a beam of light horizontally in an image forming apparatus having a base plate accommodating components, comprising:
   a reflecting surface extending perpendicularly from said base plate, said reflecting surface and said base plate being an integrated monolithic unit; and
   a reflecting film disposed on said reflecting surface to reflect an incident beam to a direction horizontal to said image forming apparatus.

2. The apparatus of claim 1, wherein said reflecting film is an aluminum thin film.

3. The apparatus of claim 1, wherein said base plate and said reflecting surface are formed by an injection molding process.

4. An apparatus for reflecting a beam of light horizontally in an image forming apparatus having a base plate accommodating components, comprising:
   a protrusion protruding perpendicularly from said base plate, said protrusion integrated with said base plate; and
   a reflecting film attached on said protrusion to reflect an incident beam into a horizontal direction.

5. The apparatus of claim 4, wherein said reflecting film is a metallic thin film.

6. The apparatus of claim 5, said metallic thin film comprising an aluminum.

7. The apparatus of claim 4, said base plate and said protrusion formed by an injection molding process.

8. The apparatus of claim 4, wherein said base plate and said protrusion are a single integrated monolithic unit.

9. The apparatus of claim 7, wherein said base plate and said protrusion formed as a single monolithic unit.

10. An apparatus for reflecting a beam of light horizontally in an image forming apparatus having a base plate accommodating components, consisting essentially of:
    a reflecting surface extending perpendicularly from said base plate, said reflecting surface and said base plate being an integrated monolithic unit; and
    a reflecting film disposed on said reflecting surface to reflect an incident beam to a direction horizontal to said image forming apparatus.

11. The apparatus of claim 10, wherein said reflecting film comprising an aluminum.

12. The apparatus of claim 10, said base plate and said reflecting surface formed by an injection molding process.

* * * * *